United States Patent [19]

Vagnozzi

[11] Patent Number: 4,752,239
[45] Date of Patent: Jun. 21, 1988

[54] CIRCUIT BREAKER SUPPORT AND CONNECTION MODIFYING DEVICE

[75] Inventor: Paul G. Vagnozzi, East Windsor, N.J.

[73] Assignee: Heinemann Electric Company, Lawrenceville, N.J.

[21] Appl. No.: 19,123

[22] Filed: Feb. 26, 1987

[51] Int. Cl.[4] .......................................... H01R 13/73
[52] U.S. Cl. .................................. 439/530; 439/535
[58] Field of Search ............... 439/527, 529, 530, 533, 439/535–539, 571, 573; 200/296, 297; 174/53–54, 58–64

[56] References Cited

U.S. PATENT DOCUMENTS

| | | | |
|---|---|---|---|
| 2,828,394 | 3/1958 | Mayzik | 439/535 |
| 2,843,652 | 7/1958 | Manzella | 439/536 |
| 2,908,743 | 10/1959 | Premoshis | 439/535 |
| 3,335,330 | 8/1967 | Hall | 439/527 |
| 3,716,651 | 2/1973 | Werner | 439/535 |

*Primary Examiner*—John McQuade
*Attorney, Agent, or Firm*—Dann, Dorfman, Herrell and Skillman

[57] ABSTRACT

A circuit breaker device is provided with a pair of molded barrier adapter channels having stepped channel bottom portions conforming, respectively, to the upper and lower back edge corners of the breaker. A studded terminal from the back edge of the breaker casing passes through the portion of the channel bottom conforming to the back of the casing. A preferred conductor bar has one of its parallel ends secured to the threaded stud by a nut, completing both electrical connection to the conductor bar and mechanical support of both the bar and the adapter. The parallel channel side walls, in turn, are terminated at the rear of the barrier channel adapters in flat edges which mount to a supporting rear panel. Connection to the panel is made through a bridge portion between the web through which a fastener can pass. The conductor bar is of such form as to position its other end for front connection to the circuit elements, such as connector tabs from a bus bar at the power side or a conductor to the individual protected load.

7 Claims, 1 Drawing Sheet

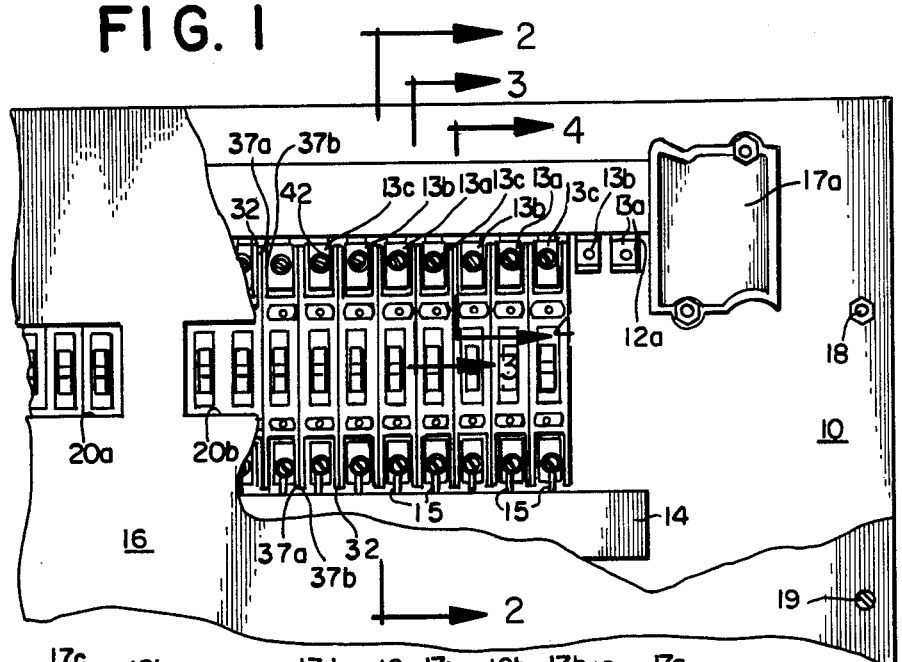
FIG. 1
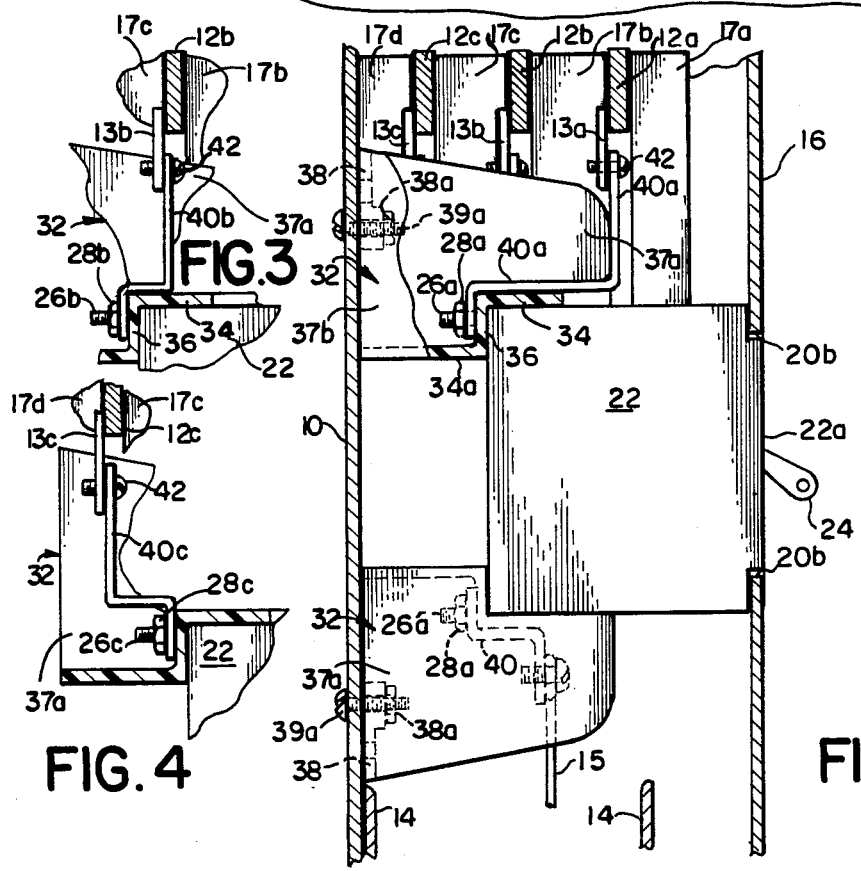
FIG. 3
FIG. 4
FIG. 2

CIRCUIT BREAKER SUPPORT AND CONNECTION MODIFYING DEVICE

The present invention relates to a means for mechanically supporting circuit breakers on a back panel while permitting electrical connection from the front before covering them with a front panel. More specifically, the present invention provides an adapter means which may be attached mechanically to circuit breakers through electrical terminals projecting from the back edge of their casing. The same connection supports an adapter conductor bar conveniently also electrically connecting it to the terminals to provide electrical connections from the front side of the breaker.

STATE OF THE ART

Various systems exist for supporting breakers on a front panel which permit making electrical connections to terminals in the rear of the breaker. Sometimes, however, it is desirable to mount the breakers in such a way that the front panel is readily removable from all of the breakers leaving them in parallel rows of side-by-side configuration. It is also valuable in such circumstances to be able to make electrical connections from the front. Means for conveniently accomplishing this purpose have not been readily available in the art and have resulted in less convenient front mounting of the breaker or some arrangement contrived on the spot for supporting the breakers from the rear.

NATURE OF THE PRESENT INVENTION

The present invention provides a very simple arrangement whereby circuit breakers which are normally electrically connected from the rear are converted to front connecting breakers. Mechanical support is provided to the breaker allowing it to be installed on a back panel and electrically connected in place from the front before the front panel is put in place.

In accordance with the present invention this conversion is accomplished using a pair of insulator support devices, referred to herein as barrier adapters or adapters. Each of the barrier adapter devices consists of a generally channel-shaped insulating body. Each adapter has a stepped channel bottom having at least portions conforming generally to the back and an adjacent edge at a remote corner of the breaker casing. Channel side wall members are generally parallel to each other and to the breaker casing side walls. Each terminal projecting from the rear of the casing passes through a conforming hole in the portion of the adapter conforming to the back of the breaker. A conductor bar, preferably of preformed rigid configuration, is connected to the terminal. Appropriate fastener means connects the connector bar electrically to the terminal and holds that bar and the barrier adapter together mechanically to the breaker casing.

The conductor bar is preferably a rigid preformed member. This may require a single conductor bar for connection to a single phase bus. In the case where three phase power is used the line connections may require interchangeable connector bars of three different configurations for connnecting to each of three buses. This may necessitate at least one of the bars being bent in a different direction to reach the appropriate bus. On the other side of the breaker, however, the connection to the load may be a standard connector to which a conductor connected to the load may be connected. The load conductors may be flexible conductors carried in a channel on the back panel. In each case, the barrier adapter is advantageously provided with square back edges to its channel side walls which support the adapter squarely against the back wall. A connecting bridge between the side walls provides a means for securing the barrier adapter to the supporting back panel by an appropriate fastener.

The barrier adapters are each pre-assembled with a connector bar to a breaker terminal. Advantageously parallel threaded terminal studs are provided on the back edge of the breaker casing near the top and bottom corners, respectively. One of the terminals passes through that portion of the stepped channel bottom of the barrier adapter conforming to the back edge of the breaker casing and through an end of the conductor bar. Both the barrier adapter and the conductor bar are thus held in place mechanically to the breaker casing by a nut, which also provides electrical connection between the conductor bar and the terminal stud.

THE DRAWINGS

For a better understanding of the present invention, reference is made to the accompanying drawings in which FIG. 1 illustrates the upper right corner of a circuit breaker panel board configuration having a plurality of breakers installed using the barrier adapters of the present invention, with part of the front panel broken away to show the internal structure;

FIG. 2 is an enlarged sectional view taken along the line 2—2 of FIG. 1;

FIG. 3 is a partial sectional view of the scale of FIG. 2 taken along line 3—3 of FIG. 1; and FIG. 4 is a partial sectional view of the scale of FIG. 2 taken along line 4—4 of FIG. 1.

DESCRIPTION OF THE SPECIFIC EMBODIMENT

FIG. 1 illustrates a portion of a circuit breaker panel board having part of the front panel broken away to expose part of one of parallel rows of breakers. The panel structure is composed of a support structure including parallel panels 10 and 16. The back panel 10, which is normally not visible, provides support for parallel highly conductive bus bars 12a, 12b and 12c for a three phase power system and a channel 14 for carrying load connecting conductors. Bus bars 12a, 12b and 12c (as seen in FIG. 2) must be mutually insulated from themselves and mechanically supported relative to one another and the panel 10. This may be accomplished using a stack of molded insulator spacers 17a, 17b and 17c and caps 17d and bolts, as shown, or in other ways known to the art. It will be understood that the three phase arrangement shown is merely illustrative and that a single bus bar for single phase or multiple bus bar for single phase or single or multiple bus bars for DC options may be employed. For example, two bus bars could be employed for positive and negative DC voltages.

The front panel 16 is spaced from the back panel 10 by columns 18 which determine the spacing between the panels. The columns are supported on back panel 10 and front panel 16 is secured to the columns by screws 19. Panel 16 has a plurality of cutouts, represented by cutouts 20a and 20b, through which the toggle switches of adjacent breakers in a row are accessible.

The breakers can be of any conventional form but, as seen in FIG. 3, are preferably of a type housed within a generally rectangular molded insulating casing 22. In this instance, the casing is provided with a protruding stepped front edge 22a of uniform cross-section across the width of the breaker so that the row of breakers together provides a uniform rectangular protrusion which fits snugly within the cutout 20b. The protrusion 22a preferably is designated to be flush with the front surface of the panel 16. When the panel 16 is assembled, the protrusion 22a enters and fills the space of the cutout 20b. The individual toggle switches 24 may be provided with labels identifying their function fixed above or below the switches on the panel board 16. The construction permits the front panel to be removed or installed from the front without any disconnection of the breakers or other parts.

Once the front panel 16 is removed, the bus bars 12a, 12b and 12c and load connector cable channel 14 are exposed and electrical connections are accessible.

The present invention is currently concerned with the support of circuit breakers from the back enabling electrical connection thereof from the front, and particularly concerns support of circuit breakers from a rear panel in the environment disclosed. The invention is applicable particularly to circuit breakers of the type disclosed in FIG. 2 having, for example, a molded casing with generally parallel terminals protruding from the back edge of the casing. Such breakers are, in general, designed to be electrically connected from the rear and mechanically supported in the front, usually to the front panel. In accordance with the present invention, however, it is possible by providing barrier adapter devices to do the mounting from behind and to provide electrical connection from the front side of the breaker.

The type of breaker illustrated wherein the parallel terminals are adjacent the corners and are provided by threaded studs is particularly well-adapted for use in the present invention, although other types of terminals could be employed. The barrier adapters are advantageously molded insulator channels with designed insulating properties appropriate to their application. The barrier adapters generally designated 32 are provided with a stepped bottom to the channel providing conforming portions 34,36. The conforming portions define the boundaries of the barrier adapter either along the top or bottom edge and along the back edge, in each case adjacent to a corner between the adjacent edges. The conforming parts, part of the stepped channel bottom, here are shown as continuous planar members which are joined at right angles. Such a construction is preferable with a rectangular casing. Also it is possible alternatively for the sidewalls to extend beyond the channel bottom and bear against the breaker casing edges with the channel bottom recessed away from the edges. Although continuity is not essential, conformance or fit is important for solid mechanical support. Preferably, the channel bottom wall is advantageously continued beyond the step in part 34a beyond the conforming parts 34 and 36 for greater structural strength. The member 36 conforming to the back of the breaker casing also must have an opening of sufficient size to accommodate the threaded terminal 26a or 26b. The preferred barrier adapter is, in effect, a stepped channel member with parallel side walls 37a and 37b, preferably having the profile as shown in FIG. 2. Wall 37a is broken away in FIG. 2 to better illustrate the conductor bar and attachment. Across the side walls 37a and 37b is a connecting web 38 which may be thickened at 38a for reinforcement and provided with a hole in order to accommodate fastening means 39a which fixes the barrier adapter to the back panel 10. The respective barrier adapters used at the top and bottom back corners of the breaker casing are structurally similar but mirror images of one another. Obviously, the various parts of the barrier adapter need not be imperforate or continuous but could employ discontinuities or openings for various reasons.

The conductor bar for connection to the bus bars takes three different forms 40a, 40b and 40c, shown in FIGS. 2, 3 and 4, respectively. In each form, a preferred feature in common is that the end portions to which connections are made are parallel to one another. Advantageously also, where possible the bar is made to conform to channel bottom members 36 and 34. However, this may not be possible as in FIG. 4 where bar 40c has a reverse bend in it.

In each case the connector bar is intended to connect to a tab 13a, 13b or 13c from the "a", "b" or "c" bus bars 12a, 12b or 12c. The connections of the bus bar to power are not illustrated but are conventional and well known in the art. Connecting the connector bars 40a, 40b and 40c to tabs 13a, 13b and 13c are screws 42. Preferably the back member, here tabs 13a, 13b or 13c, or both members are threaded for positive engagement of the screw.

Although the structure of the barrier adapter at the bottom of the breaker as seen in FIG. 2 is the mirror image of the barrier adapter at the top and corresponding numbers are used to identify parts, it will be observed that only a single type of connector bar 40 need be employed because, in this case, the screw connector connects a conductor or cable 15 to the conductor bar breaker terminal 26b. However, a nut 43 or other means of clamping the conductor in place will usually be employed. It will be understood that the conductors are brought into the space between the panels 10 and 16 in the channel or trough 14 which is supported on panel 10. The conductors 15 are fed to the individual breakers and, in turn, lead out of the panel area to the respective loads controlled by the breakers.

The invention has been described in terms of a single embodiment. It will be understood by those skilled in the art that various modifications to the embodiment shown may be made. Such variations within the scope of the claims are intended to be within the scope and spirit of the present invention.

I claim:

1. An adapter device for permitting mounting at the rear and electrical connection from the front of a circuit breaker casing having generally parallel sidewalls closed by edge walls and having a pair of terminals extending from the back edge wall of the breaker comprising a generally channel shaped insulator body having a stepped bottom portion conforming generally to a portion of the back and an adjacent edge wall at a corner of the breaker casing with sidewalls generally parallel to each other and the breaker casing side walls;

a conductor bar having generally parallel end portions for making electrical connections between a breaker terminal at one end and a conductor at the other end and an intermediate portion extending between the end portions; and means to fasten an end portion of the conductor bar and the channel shaped insulator body to the breaker terminal to electrically connect the terminal and the connector bar and mechanically hold the pieces together.

2. The adapter device of claim 1 in which the channel shaped insulator body sidewalls are connected together by a connecting web essentially parallel to the part of the stepped bottom portion which fits against the back edge wall of the casing which web permits the adapter to be fixed by a fastener to a support at the rear of a breaker to which it is attached.

3. The adapter device of claim 1 in which the terminals are parallel rearward projecting threaded studs on the breaker casing and the portion of the stepped bottom portion of the channel shaped insulator body, conforming to the back and an adjacent edge wall of the casing, is provided with an opening through which the threaded stud extends, the conductor bar is provided with an opening at one end which fits over the threaded stud and the means to fasten the end of the conductor bar to the breaker terminal is a nut which threadably engages the terminal and conductively engages the conductive bar.

4. The adapter device of claim 3 in which the conductor bar is sufficiently rigid to be capable of lending mechanical support to the breaker when connected to a bus bar connector.

5. A circuit breaker support and connection configuration provided in connection with a circuit breaker having a generally rectangular insulating casing having broad side walls and narrow front and back, top and bottom edge walls, the back edge wall being generally at right angles to the top and bottom edge walls, and being provided with generally parallel terminal conductors extending from the back edge wall of the casing;

a pair of generally channel-shaped adapters of insulating material including a stepped portion conforming to the rear and an adjacent edge wall at a corner of the casing and provided with an opening in the stepped channel bottom portion conforming to the back edge wall positioned to permit passage of a terminal through the opening, the adapters having generally parallel channel sidewalls connected by a supporting web between the sidewalls, which web conforms in shape to a support, enabling the adapter to be affixed to the support at a position remote from the breaker; and conductor bars for the respective terminals and means to fix one of a pair of conductor bars to each of the terminals to make a positive electrical connection and provide mechanical support both for the conductor bar and for the adapter to the casing.

6. The configuration of claim 5 in which conforming portions are molded pieces at right angles to one another, each terminal conductor is a threaded stud projecting through a hole in the stepped channel bottom portion of the adapter and each connector bar having a hole in one end positioned over the stud and the means to fix each conductor bar to a threaded stud is a nut whereby the nut provides conductive connection between the conductor bar and the stud and mechanical support of the adapter relative to the breaker casing.

7. An assembly of configurations of claim 6 in which a plurality of circuit breakers are arranged in side-by-side arrangement in which conductor bars are provided in three different configurations for connection to connectors for each of three parallel buses.

* * * * *